UNITED STATES PATENT OFFICE.

HEINRICH NERESHEIMER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

VAT DYES OF THE ANTHRAQUINONE SERIES.

1,052,507.      Specification of Letters Patent.      Patented Feb. 11, 1913.

No Drawing.      Application filed October 11, 1912. Serial No. 725,151.

*To all whom it may concern:*

Be it known that I, HEINRICH NERESHEIMER, subject of the Queen of the Netherlands, residing at Ludwigshafen-on-the-Rhine, Germany, have invented new and useful Improvements in Vat Dyes of the Anthraquinone Series, of which the following is a specification.

I have found that by subjecting anthraquinone-acridones substituted with halogen in the benzene residue to treatment with a nitrating agent and then reducing the nitro compounds thus obtained, coloring matters are produced which dye cotton, from a vat, from blue to bluish green shades of excellent fastness.

My new coloring matters consist, when dry, of blue to blue-green powders which are insoluble in dilute acids and alkalis, but are soluble in nitrobenzene and in anilin yielding from blue to blue-green solutions, and in concentrated sulfuric acid yielding red to brown solutions.

The following examples will serve to illustrate further the nature of my invention, which, however, is not confined to these examples. The parts are by weight.

Example 1: Suspend 100 parts of chloranthraquinone-acridone (obtainable by treating anthraquinone-acridone with sulfuryl chlorid in the presence of monochlorbenzene) in 1,000 parts of nitrobenzene, and add gradually, while stirring well, at the temperature of the water-bath, 150 parts of 87% nitric acid. The reaction is complete when a test portion, after being filtered and washed with alcohol and reduced with alkaline hydrosulfite solution, dyes, from a vat, blue shades on cotton. Allow the melt to cool, filter and wash the residue with alcohol. In order to reduce the nitro compound thus obtained, heat one part thereof in a finely divided state with 100 parts of water, 2 parts of 24% caustic soda solution, and 10 parts of sodium hydrosulfite solution of 10° Bé. for 30 minutes at from 90° to 95° C. Then complete the precipitation of the coloring matter, if necessary, by blowing air through the solution and filter off and wash the said coloring matter with water. It dyes, from a vat, blue shades on cotton and is, when dry, a blue powder which is insoluble in the usual solvents, but yields blue solutions in nitrobenzene and in anilin, and a reddish yellow solution in concentrated sulfuric acid.

Example 2: Introduce, while stirring, well, a paste of 100 parts of monobromanthraquinone-acridone and 150 parts of sulfuric acid monohydrate into 400 parts of a mixture containing 86.4% of nitric acid and 13.6% of sulfuric acid, at a temperature of from −5° to −10° C. When the nitration is complete, pour the mixture on ice, filter, and wash the residue with hot water and with dilute caustic soda solution, in order to remove by-products. The paste obtained can be directly reduced in the manner described in the foregoing Example 1, whereupon a coloring matter is obtained which dyes, from a vat, bluish green shades on cotton. When dry, it is a blue-green powder which is somewhat soluble in anilin and in benzene, yielding blue-green solutions. It dissolves in concentrated sulfuric acid, the solution being yellow-red.

Example 3: Introduce 100 parts of dichlor-anthraquinone-acridone, of a composition corresponding to the formula

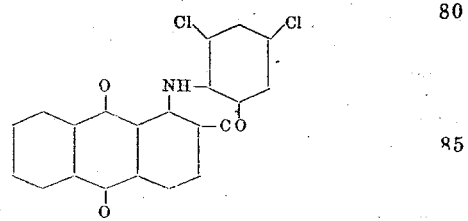

(obtainable from the ethyl ester of 1-chloranthraquinone-2-carboxylic acid and 2.4-dichlor-anilin) into five hundred parts of 87% nitric acid, while maintaining a temperature below 0° C. It gives a brown-yellow solution. After a short time, the nitro compound begins to separate out and is complete in about one hour. Then filter off the precipitate and wash it, first with glacial acetic acid and then with water, and dry it. In order to reduce it, heat it in a finely divided state with a solution of 130 parts of sodium sulfid in 1300 parts of water, for 1 hour, at from 80° to 90° C. Then filter, wash with hot water. The paste obtained dyes cotton, from a vat, clear greenish blue. When dry, it consists of a dark blue powder which is insoluble in dilute acids and alkalis, but yields a greenish blue solution in nitrobenzene and in anilin, and a brown-yellow solution in concentrated sulfuric acid.

Now what I claim is:—

1. The process of producing vat dyes of the anthraquinone series by treating an anthraquinone-acridone substituted with halogen in the benzene residue with a nitrating agent and then reducing the nitro compound thus obtained.

2. The process of producing a vat dye of the anthraquinone series by treating 2.4-dichlor-anthraquinone-acridone, containing the chlorin atoms in the benzene residue, with nitric acid and then reducing the nitro compound thus obtained.

3. The new vat dyes being probably amino-anthraquinone-acridones substituted with halogen in the benzene residue, which consist, when dry, of from blue to blue-green powders, which are insoluble in dilute acids and alkalis, but which yield blue to blue-green solutions in nitrobenzene and in anilin, and from red to brown solutions in concentrated sulfuric acid, and which dye, from a vat, blue to bluish green shades on cotton.

4. The new vat dye which is probably amino-2.4-dichlor-anthraquinone-acridone, containing the chlorin atoms in the benzene residue, which, when dry, is a dark blue powder which is insoluble in dilute acids and alkalis, but which yields a greenish blue solution in nitrobenzene and in anilin, and a brown-yellow solution in concentrated sulfuric acid, and which dyes cotton, from a vat, greenish blue.

In testimony whereof I have hereunto set my hand in the presence of two subscribing witnesses.

HEINRICH NERESHEIMER.

Witnesses:
J. ALEC. LLOYD,
JOSEPH HEIFFER.